Oct. 13, 1970     E. A. FENNER     3,534,405
AIRCRAFT LIGHTING SYSTEM
Filed Oct. 30, 1967     2 Sheets-Sheet 1
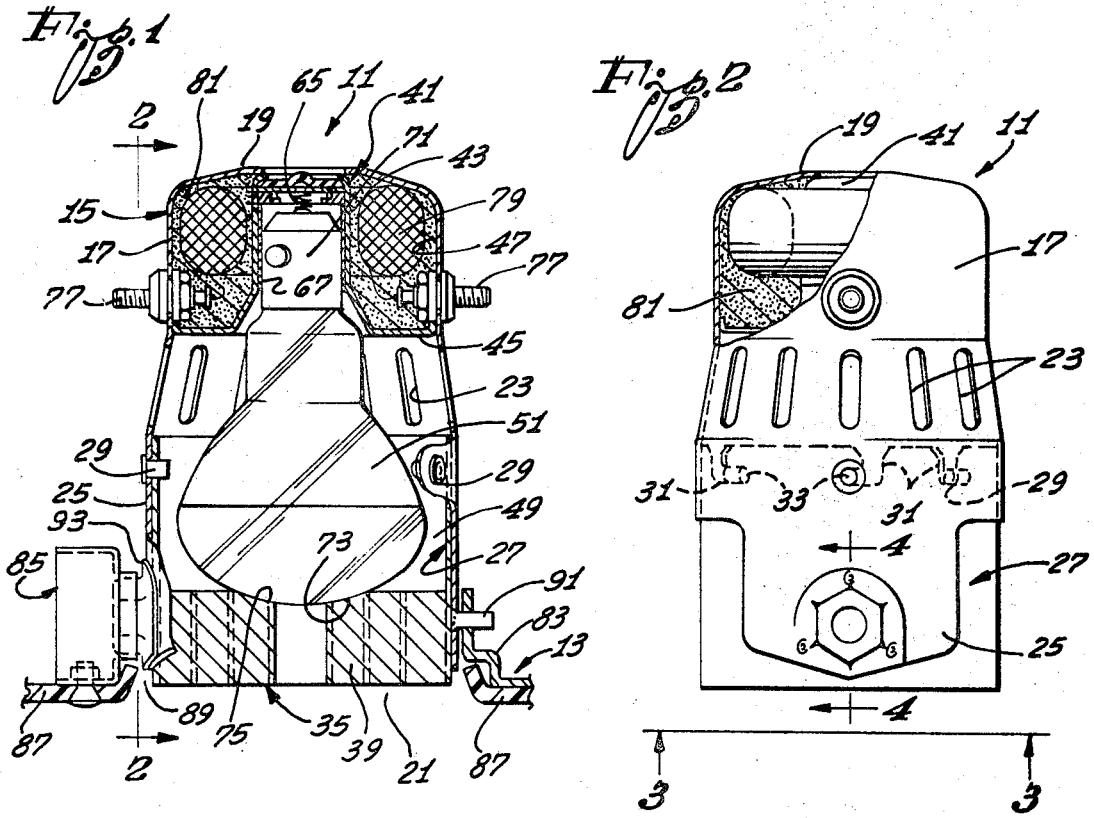
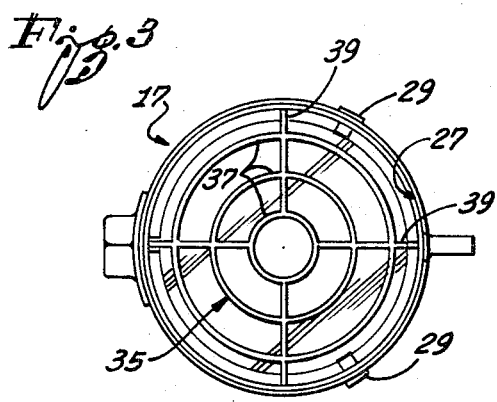
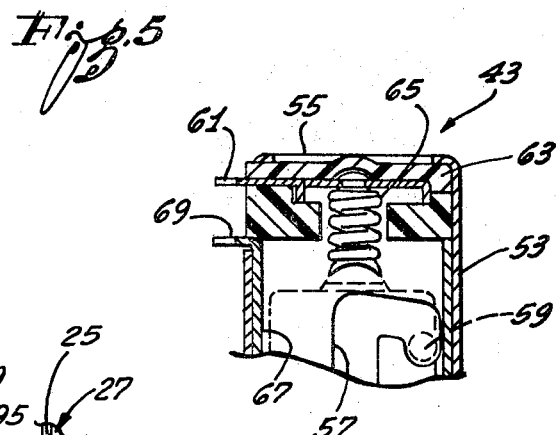
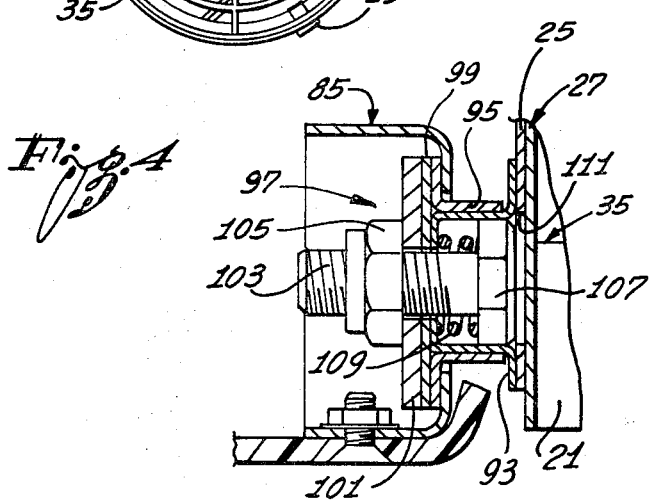
INVENTOR,
Ernest A. Fenner
ATTORNEYS

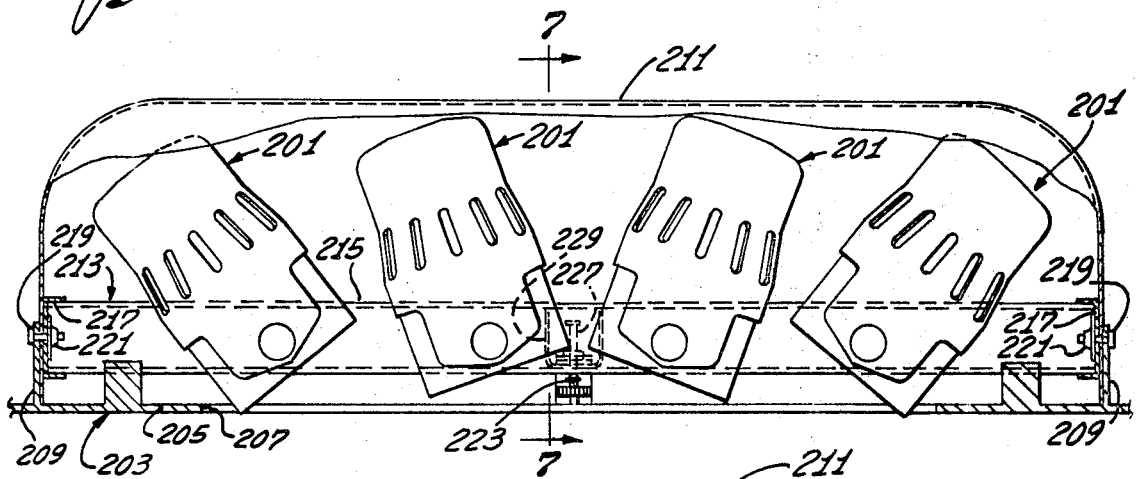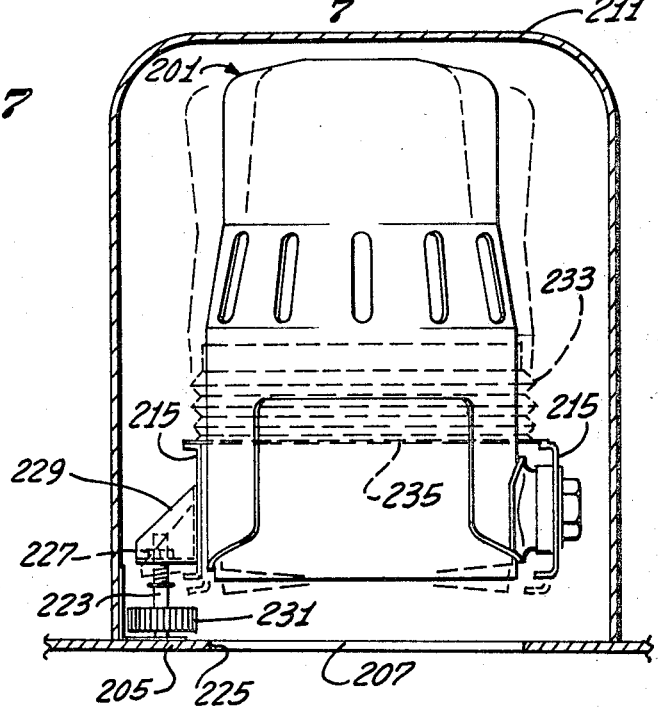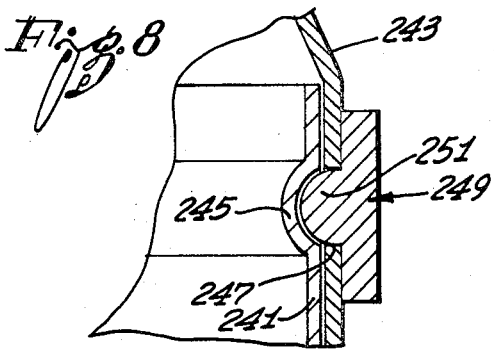

United States Patent Office 3,534,405
Patented Oct. 13, 1970

3,534,405
AIRCRAFT LIGHTING SYSTEM
Ernest A. Fenner, Anaheim, Calif., assignor to Bruce Industries, Inc., Gardena, Calif., a corporation of California
Filed Oct. 30, 1967, Ser. No. 678,980
Int. Cl. B64d 47/02
U.S. Cl. 240—7.7            11 Claims

ABSTRACT OF THE DISCLOSURE

An aircraft lighting system including a plurality of passenger reading lights each of which has its own transformer associated therewith to step down the voltage to a level useful by the light. The passenger reading light may include a housing having a socket for receiving a lamp and directing the illumination from the lamp in the desired direction. The transformer may be positioned within the housing. The housing is preferably movably mounted to a suitable supporting structure within the aircraft.

BACKGROUND OF THE INVENTION

As is well known, modern commercial aircraft generally have two separate interior lighting systems. The first of these is the indirect system which illuminates the ceiling of the cabin and the second of these is the passenger reading light system. The passenger reading light system includes many small individual lights, one of which is customarily located overhead above each of the passenger seats and is under the control of the individual passenger.

One problem is brought about by the necessity of utilizing relatively low voltage electrical power for operating the passenger reading lights. Low voltage power, commonly 28 volts, must be used in lieu of the standard 110 volt power to prevent the filaments of the lamp from overheating. In addition, if relatively high voltage is used, the lamp filament must be correspondingly smaller and as such is more subject to breakage due to vibration of the aircraft. Accordingly, transformers are used to step down the standard 110 volt power to 28 volts.

Heretofore one such transformer has been used for many of the passenger reading lights. For example, one transformer might be used for 12 separate reading lights. Thus, each transformer must be physically spaced a substantial distance from many of the passenger reading lights to which it supplies low voltage power. To avoid excessive power loss in the low voltage line leading from the transformer, it is necessary to utilize large diameter wire between the transformer and each of the lights. The large diameter wire is very undesirable because it is heavy, and therefore adds substantial weight to the aircraft.

A second problem with prior art lights of this type concerns the changing of lamps in the fixture. The need to remove a burned out lamp and replace it with a new one occurs quite frequently because of the vibration to which the filament of the lamp is subjected by the aircraft band because of the use to which the reading lamps are put. With the prior art passenger reading lights it is necessary to remove a section of the supporting structure for the lamp or the passenger service unit in order to relamp. Following this removal, relamping is accomplished from above. This is time consuming and difficult process.

A further problem with prior art passenger reading lights is that to adjust the angle thereof to thereby adjust the direction of the beam of the light emitted thereby it is necessary, as with the relamping procedure, to remove a portion of the overhead structure and accomplish the position change from overhead. Furthermore, the position of the light can only be changed by removing a nut, changing the angular position of the light, and then replacing the nut. This is also a time consuming process which requires the use of some tools to perform.

As indicated above the aircraft subjects the lamp and the filament thereof to vibrations. It is important therefore that the lamp be mounted within the fixture as securely as possible to prevent or reduce the tendency of such vibrations to damage the filaments of the lamp. It is also important that the lamp be allowed to operate at as low temperature as possible to prevent overheating and weakening of the filament. Heretofore, such reading lights have often incorporated lenses which tend to retain the heat of the lamp within the fixture to thereby increase the temperature of the filament resulting in a weakening of the filament which may produce an early failure of the lamp.

Finding of a satisfactory solution to the problems each passenger reading light must produce high intensity illumination at a substantial distance therefrom without allowing any significant amount of diffusion. By way of example, for one modern aircraft each passenger reading light must produce 20 to 25 foot-candles in a 20" diameter pattern 62" from the source. Further, the intensity of illumination 3" from the circumference of the 20" diameter pattern must be less than 1.5 foot-candles.

SUMMARY OF THE INVENTION

With the present invention the weight of an aircraft passenger reading light system is significantly reduced. Relamping and adjusting of the angular position of the light can be accomplished from below without removal or adjustment of the supporting structure for the light or the wall section adjacent the light. The present invention eliminates the need for all lenses in the passenger reading light and thereby reduces the tendency of the filament of the lamp to overheat and further reduces the weight of the lamp. Although no lenses are required, the passenger reading light of this invention provides high intensity illumination within a confined pattern at a substantial distance from the source.

The present invention teaches that the weight of a passenger reading light system for an aircraft can be significantly reduced by utilizing a separate transfer for each of the passenger reading lights and by positioning each such transformer closely adjacent its associated light. This eliminates or substantally reduces the amount of heavy large diameter wire required to electrically interconnect the transformer and the passenger reading light. Positioning of the transformer immediately adjacent or within the housing of the passenger reading light is considered optimum because this virtually eliminates all of the heavy wire utilized to carry the lower voltage electrical power. Although use of several transformers may increase the total transformer weight carried by the aircraft, the net effect of this improvement results in substantial weight savings.

This feature may be embodied in a passenger reading light which includes a housing having a peripheral wall and at least one open end and a socket mounted within the housing for retaining an electric lamp therein. Preferably the transformer is mounted within the housing and, in a preferred form of the invention, the transformer is generally annular and surrounds at least a portion of the socket. The peripheral wall of the housing surrounds the electric lamp and directs the illumination therefrom outwardly through the open end of the housing in a confined beam.

The present invention also teaches that angular adjustment of the passenger reading light from below can be accomplished without disturbing the supporting structure for the light by providing locking and releasing means for affixing the position of the passenger reading light with such locking and releasing means being accessible from below.

This feature of the invention may be embodied in a passenger reading light in which the peripheral wall of the housing is pivotally mounted on the supporting structure for movement about a pivotal axis. The housing may be affixed in a selected angular position by a suitable lock. Releasing means are provided for releasing the lock to allow movement of the housing to other desired angular positions thereof. The releasing means is mounted on the housing and is accessible through the open end thereof to allow adjustment of the angular position of the housing without disturbing the supporting structure.

Another feature of the present invention is to utilize quick release means for releasing the lock. By using quick release means, the lock can be released by a simple manual movement of an appropriate member such as a depressible button. Thus, with the present invention, the angular position of the passenger reading light can be adjusted without the aid of any tools. Preferably, the lock should lock automatically when the quick release means is not actuated to thereby further simplify the adjustment procedure.

With the present invention, illumination from the lamp is directed outwardly through the open end of the housing in a confined beam. To assure that the pattern of illumination will be sufficiently confined at a substantial distance from the source, the housing includes a collimator which forms a portion of the peripheral wall of the housing. To further reduce diffusion of the light, a grid is mounted in the collimator. Although it may be possible to utilize grids of varying designs, in a preferred form, the grid includes a plurality of concentric rings interconnected by several radially extending webs. It has been found that a grid of this configuration substantially assists the formation of the desired confined beam of illumination whereas grids of at least some other configurations are totally unsuited for this purpose.

To firmly mount the lamp and to prolong the life thereof, the present invention teaches supporting the opposed ends of the lamp by the socket and the grid, respectively. To obtain some vibration damping, the present invention teaches resiliently mounting the electric lamp between the socket and the grid. These features of the invention may be embodied in a passenger reading light in which the lamp is retained in the socket for limited axial movement relative thereto and a spring is provided for urging the lamp axially outwardly into engagement with the grid. Preferably, the inner surface of the grid is recessed to conform generally to the contour of the surface of the lamp and is held in engagement therewith to further support the lamp. Thus, the lamp is resiliently supported between the socket and the grid.

To allow relamping from below, i.e. through the open end of the housing, the present invention teaches that the grid should be removable from the housing to provide access to the lamp to allow removal thereof from the socket. In the embodiment illustrated, this is accomplished by utilizing a removable collimator and by affixing the grid to the removable collimator.

The present invention also provides for mounting a passenger reading light for pivotal movement about two generally transverse pivotal axes. This can be advantageously accomplished by pivotally mounting a frame to the passenger reading light supporting structure for pivotal movement about a first pivotal axis and then mounting the individual passenger reading light on the frame as described above for pivotal movement about a second pivotal axis. The frame is mounted above the lower wall of the passenger service unit and such wall has an opening therein through which the beam from the passenger reading light can pass. Of course, more than one passenger reading light may be mounted on the frame.

The present invention also teaches that it is desirable to accomplish the pivotal adjustment of the frame from below without the need for removing any sections of the passenger service unit or of the supporting structure for the frame. This may be accomplished, for example, by a movable member which is positioned above the wall of the passenger service unit adjacent the opening therein. Such member may be a threaded member which engages the frame so that by turning of such member the angular position of the frame can be varied.

The invention, both as to its organization and method of operation together with further features and advantages thereof may best be understood by reference to the following description taken in connection with the accompanying drawings.

BRIEF DESCRIPTION OF THE DRAWINGS

FIG. 1 is a longitudinal sectional view through a preferred form of passenger reading light of this invention.

FIG. 2 is a side elevational view partially in section of the light with the supporting structure and lock removed and taken in the direction of the arrows in FIG. 1.

FIG. 3 is a bottom plan view taken along line 3—3 of FIG. 2 and illustrating the shape of the grid.

FIG. 4 is an enlarged fragmentary sectional view taken along line 4—4 of FIG. 2 and illustrating the locking and releasing means of the passenger reading light.

FIG. 5 is an enlarged fragmentary sectional view through a portion of the socket.

FIG. 6 is a longitudinal sectional view showing how one or more of the passenger reading lights may be mounted within a passenger service unit. Some of the details are not shown in FIG. 6 in order to show more clearly the mounting of the passenger reading lights.

FIG. 7 is a sectional view taken along line 7—7 of FIG. 6.

FIG. 8 is an enlarged fragmentary sectional view showing an alternate manner for releasably interconnecting the collimator to the remainder of the housing for the passenger reading light.

DESCRIPTION OF THE PREFERRED EMBODIMENT

Referring to the drawings and in particular to FIGS. 1 and 2 thereof reference numeral 11 designates a passenger reading light constructed in accordance with the teachings of this invention. The passenger reading light 11 is pivotally mounted on a supporting structure 13 within an aircraft. In the usual system the aircraft contains a large number of passenger reading lights 11 and each of the lights is normally positioned above a corresponding passenger seat (not shown), to provide additional illumination for the occupant of such seat.

The passenger reading light 11 includes a housing 15 having a peripheral wall 17, an end wall 19, and an open end 21. The housing 15 is of generally cylindrical configuration and has a plurality of generally axially extending slots 23 formed in the peripheral wall 17 for providing ventilation. The peripheral wall 17 is axially elongated and may have a generally frustoconical section intermediate the ends thereof in which the slots 23 are formed.

The peripheral wall 17 of the housing 15 includes a section 25 integral with the end wall 19 and a removable collimator 27 in the form of a cylindrical sleeve. The collimator 27 is positioned within the section 25 of the peripheral wall 17 and is removably attached thereto by a plurality of pins 29 and cooperating J-slots 31. In the embodiment illustrated, the pins 29 are affixed to the section 25 and the slots 31 are formed in the inner end of the collimator 27. Thus, the collimator 27 may be attached to the section 25 by moving the collimator axially to allow the pins 29 to enter the axially extending portion of the J-slots 31 and then rotating the collimator to allow the pins to enter the circumferentially extending portions of the J-slots. If desired, each of the J-slots 31 may terminate in a small axial portion 33 (FIG. 2) to prevent unintentional counterrotation of collimator 27 relative to the section 25.

A grid 35 is rigidly affixed to the collimator 27 closely adjacent the outer end thereof and is removable therewith. As shown in FIG. 3, the grid 35 includes a plurality of concentric cylindrical rings 37 interconnected by radially extending webs or slats 39. The webs 39 extend radially outwardly beyond the outermost ring 37 and into contact with the collimator 27 to allow the collimator to be attached thereto in any suitable manner such as by brazing.

One purpose of the grid 35 is to assist the collimator 27 in producing a suitably confined beam of illumination Accordingly, the grid 35 may assume any configuration which will assist in accomplishing this function. It has been found, however, that the use of several spaced concentric rings 37 and radial webs 39 works very satisfactorily, whereas some other grid configurations do not achieve the desired light confining function. By way of example, in the embodiment illustrated three equally spaced rings 37 and four equally spaced webs 39 are employed. As shown in FIG. 1, the grid 35 has an appreciable axial dimension.

The light 11 also includes a socket 41 adjacent the end wall 19 of the housing 15. The socket 41 includes a lamp retaining portion 43 and a flange portion 45. As shown in FIG. 1, the lamp retaining portion 43 abuts the end wall 19 and the flange portion 45 extends radially outwardly thereof to divide the housing 15 into an inner chamber 47 and an outer chamber 49. The flange portion 45 is preferably suitably attached to the peripheral wall 17. An electric incandescent lamp 51 is retained within the lamp retaining portion 43. As best seen in FIG. 5, the lamp retaining portion 43 includes a peripheral wall 53 and an end wall 55 with the peripheral wall 53 containing a plurality of J-slots 57. The lamp 51 adjacent the inner end thereof has a plurality of lugs 59 for cooperating with the J-slots 57 to retain the lamp 51 within the lamp retaining portion 43. As shown in FIG. 5, J-slots 57 and the lugs 59 are shaped and sized to allow for limited axial movement of the lamp 51 relative to the peripheral wall 53 when the lamp is retained therein.

A conductor 61 is embedded in insulation 63 adjacent the end wall 55. An electrically conductive spring 65 is affixed to the conductor 61 and engages the lamp 51. A conductive sleeve 67 having a terminal 69 exposed at the exterior of the insulation 63 is suitably mounted within the peripheral wall 53 and has the J-slots 57 extending therethrough. The sleeve 67 electrically contacts a conductive portion 71 of the lamp 51 in a well-known manner. Thus, electrical energy can be supplied to the lamp 51 through the conductor 61, the spring 65, the sleeve 67 and the terminal 69.

As shown in FIG. 1, the lamp 51 has an outer surface 73 which engages a complementary shaped inner surface 75 of the grid 35. In the embodiment illustrated, the outer surface 73 is convex and the inner surface 75 is in the form of a concave recess for receiving a portion of the outer surface 73. The lamp 51 is, therefore, firmly retained by both the socket 41 and the grid 35. Thus, the grid 35 performs the important functions of (1) reducing diffusion, (2) supporting of the lamp 54 and (3) dissipating heat from the lamp to its supporting structure.

The spring 65 engages the inner end of the lamp 51 and urges the lamp axially outwardly into engagement with the grid 35. Such limited axial movement is provided for by appropriately shaping and sizing the J-slots 57 and the lugs 59. Thus, the spring 65 causes the lamp 61 to be resiliently supported to thereby achieve a vibration damping effect.

110 volt electrical energy is supplied to the reading light 11 through a pair of terminals 77 each of which is suitably affixed to the peripheral wall 17. Preferably only one of such terminals is provided and the housing is connected to ground. A suitable step down transformer 79 is provided within the inner chamber 47 of the housing 15 and the primary thereof is suitably electrically connected to the terminals 77. The transformer 79, which may be held in place within the chamber 47 by potting 81 reduces the voltage from 110 volts to, for example, 28 volts. The secondary of the transformer 79 is suitably electrically connected to the conductor 61 and the terminal 69 to thereby supply 28 volt power to the lamp 51. The transformer 79 is small, light weight, and preferably of annular configuration and surrounds the lamp retaining portion 43.

The means for pivotally mounting the light 11 to the supporting structure 13 is best seen in FIGS. 1–4. The supporting structure 13 may be of any suitable design and in the embodiment illustrated includes an elongated support member 83 (FIG. 1) and an elongated channel 85 extending in spaced parallel relationship. The support member 83 and the channel 85 are concealed by suitable ceiling panels 87 which are spaced to provide an opening 89 for the light 11.

The light 11 has a pin 91 projecting radially from the section 25 of the housing 15 and suitably pivotally received within the support member 83. The light 11 also has a hollow boss 93 rigidly affixed to the section 25 of the housing 15 and positioned diametrically opposite the pin 91. The boss 93 is pivotally received within a collar 95 which is suitably, rigidly affixed to the channel 85. Thus, the light 11 is mounted for pivotal movement about a radially extending pivotal axis.

A releasable lock 97 is provided for locking the light 11 in a selected angular position about the pivotal axis thereof. The lock 97 includes a first disc-like locking member 99 suitably affixed to the collar 95 and a second disc-like locking member 101 suitably rigidly mounted on a radially movable member or bolt 103. The locking members 99 and 101 preferably have high-friction surfaces which are engageable to lock the light 11 in the selected angular position thereof. The locking member 101 may be retained on the movable member 103 by a nut 105. The movable member 103 has an enlarged head 107 which is slidable within the boss 93. To prevent rotation of the movable member 103 relative to the housing 15, the head 107 and the passageway through the boss 93 are of corresponding noncircular configquration and may, for example, be hexogonal in cross section. The locking members 99 and 101 are normally held in locking engagement by a coil spring 109 which acts on the head 107 to urge the movable member 103 radially inwardly.

A feature of the lock 97 is that it is of the quick release type. Thus, by merely moving the movable member 103 radially outwardly, the locking members 99 and 101 are separated or no longer held tightly together to thereby allow adjusting of the angular position of the light 11. A complementary feature is that the lock 97 is automatically operative to lock the light 11 in the new angular position upon release of the movable member 103 to allow the spring 101 to return the locking members 99 and 101 to locking engagement.

Another feature of the present invention is that the angular position of the light 11 may be adjusted through the open end 21 thereof without removing or disturbing supporting structure 13 or the ceiling panels 87. To accomplish this, an aperture 111 is provided in the section 25 of the housing 15. The aperture 111 is aligned with the head 107 of the member 103 so that upon removal of the collimator 27, access to the head 107 is easily obtainable through the open end 21 of the housing 15. Once such access is obtained, depression or movement of the movable member 103 is easily manually accomplished without the aid of any tools.

It should also be noted that relamping can be accomplished through the open end 21 without disassembling or disturbing the supporting structure 13 or the ceiling panel 87. To relamp, it is only necessary to remove the collimator 27 and the grid 35 which is affixed to the collimator. Access to the lamp 51 is then obtainable through the open end 21 of the housing 15. The lamp 51 can then be easily removed as permitted by the J-slots 57 and the cooperating lugs 59, and a new lamp inserted into the socket 41.

FIGS. 6 and 7 illustrate a preferred manner of mounting a plurality of passenger reading lights 201 in a passenger service unit 203 of an aircraft. Each of the passenger reading lights 201 may be substantially identical to the passenger light shown in FIGS. 1–5.

The passenger service unit 203 has a lower wall 205 which is located above one or more passenger seats (not shown) in a conventional fashion. The wall 205 has an opening 207 therein and webs 209 extend upwardly from the wall 205 on opposite ends of the opening 207. A cover 211 may cooperate with the wall 205 to form an inclosure for the passenger reading lights 201.

A frame 213 which includes two spaced parallel side rails 215 and two spaced relatively short end rails 217 is mounted on the webs 209. The rails 215 and 217 are suitably interconnected to form the frame 213, and the end rails 217 are pivotally connected to the webs 209 for pivotal movement about a pivotal axis by screws 219 and nuts 221. A threaded shaft 223 is suitably mounted for rotation in the wall 205 and extends upwardly therefrom adjacent an edge 225 of the opening 207. The upper end of the shaft 223 is received within a nut 227 which is fixed to a bracket 229 rigidly mounted on one of the side rails 215. An adjustment knob 231 is affixed to the shaft 223 so that by turning of the knob, the angular position of the frame 213 about the pivotal axis defined by the screw 219 can be adjusted. It should be noted that the adjustment knob 231 is positioned closely adjacent the edge 225 so that access thereto may be easily had from below through the opening 207. On the other hand, the adjustment knob 231 is positioned laterally of the edge 225 so that it will remain hidden from below.

Each of the passenger reading lights 201 are mounted on the side rails 215 for pivotal movement about individual pivotal axes which are generally perpendicular to the pivotal axis of the frame 213. The passenger reading lights 201 may be pivotally mounted on the side rails 215 in the same manner that the passenger reading light 11 of FIGS. 1–5 is pivotally mounted on the members 83 and 85. Thus, universal control of the passenger reading lights 201 is obtained.

The passenger reading lights 201 direct beams of light through the opening 207 to the passenger seats therebelow. Preferably, an elongated bellows-like member 233 is suitably mounted on a plate 235 which is fixed to the side rails 215. The bellows 233 has cut out areas therein for receiving each of the passenger reading lights 201 and serves as a light shield so that should the passenger look up into the opening 207, only the passenger reading lights 201 and the bellows-like member 233 will be visible. The bellows-like member, being quite flexible, permits pivotal movement of the passenger reading lights 201 about the pivotal axes thereof which lie transverse to the side rails 215. Of course, any suitable number of lights may be mounted on a single frame 213.

FIG. 8 shows an alternate way in which a collimator 241 can be releasably secured to the main portion 243 of the passenger reading light housing. As shown in FIG. 8 the collimator 241 has an outwardly opening peripheral groove 245 and the wall of the main portion of the housing 243 has a plurality of apertures 247 in registry with the groove 245. A lock ring 249, constructed of Teflon or other suitable material, extends completely around the housing 243 and has a plurality of locking projections 251, which are adapted to extend through the apertures 247 into the groove 245. This arrangement may be used in lieu of the J-slot construction shown in FIGS. 1–3.

Although exemplary embodiments of the invention have been shown and described, many changes, modifications, and substitutions may be made by one having ordinary skill in the art without necessarily departing from the spirit and scope of this invention.

What is claimed is:

1. An interior light for an aircraft having a light supporting structure therein, the combination of:

a housing having a peripheral wall and at least one open end;

socket means mounted within said housing remote from said open end for receiving an electric lamp, said peripheral wall surrounding the lamp and directing the light therefrom outwardly through said open end in a confined beam;

removable grid means in said housing engageable with the lamp to assist in supporting same whereby the lamp is supportable by the socket and the grid;

means for mounting the housing on the light supporting structure to allow pivotal movement of the housing about a pivotal axis to a plurality of angular positions;

means for locking the housing in a selected angular position about the pivotal axis; and transformer means within said housing electrically connected to the socket for supplying electrical energy thereto.

2. In a passenger reading light for use in an aircraft having a reading light supporting structure therein, the combination of:

a housing mounted on said supporting structure and having a peripheral wall and at least one open end;

a lamp;

socket means mounted in said housing remote from and opening toward said open end for receiving at least a portion of said lamp therein for limited generally axial movement relative thereto, said lamp being insertable through said open end and into said socket means, said socket means having releasable retaining means for retaining said lamp in said socket means and means responsive to movement of said lamp relative to said socket means to release said retaining means to allow withdrawal of said lamp out of said socket means and said housing through said open end thereof, said peripheral wall surrounding said lamp when said lamp is retained in said socket means and directing the illumination therefrom outwardly through said open end in a confined beam;

a removable grid mounted in said housing adjacent said open end thereof, said lamp being positioned between said socket means and said grid to assist in preventing diffusion of the illumination from the lamp, said grid being removable to allow removal of said lamp; and biasing means for urging the lamp into engagement with said grid to cause said lamp to be supported by said socket means and by said grid.

3. A combination as defined in claim 2 wherein said socket means includes a peripheral flange extending radially outwardly into engagement with said peripheral wall of said housing to divide said housing into an outer cavity extending to the open end of said housing and an inner cavity, and wherein transformer means are provided in said inner cavity of said housing, said transformer means being electrically connected to said socket means to provide electrical power to the lamp.

4. A combination as defined in claim 2 wherein said grid has an inner surface facing said lamp and said lamp has an outer surface facing said inner surface of said grid, said inner surface of said grid having a recess therein for receiving said outer surface of the lamp to assist in firmly supporting the lamp.

5. A combination as defined in claim 2 wherein said biasing means includes a spring within said socket means.

6. In an aircraft passenger reading light system, the combination of:

an aircraft having a plurality of passenger seats and a supporting structure above the passenger seats;

a plurality of passenger reading lights;

means for mounting said passenger reading lights on the supporting structure with each of said lights being disposed generally above one of the passenger seats;

each of said passenger reading lights including means for mounting an electric lamp and means for directing the illumination from the lamp generally downwardly in a confined beam toward the passenger seat therebelow;

a plurality of step down transformers, one of said transformers being provided for each of said passenger reading lights;

means for mounting each of said transformers closely adjacent a passenger reading light whereby one of said transformers is mounted closely adjacent each of the passenger reading lights;

a source of electrical power;

first conductor means for electrically connecting each of said transformers to said source of electrical power;

second conductor means for electrically connecting each of said transformers to its associated passenger reading light whereby each of said passenger reading lights has its own transformer from which low voltage electric power can be drawn; and each of said passenger reading lights including means for mounting said housing on the supporting structure for pivotal movement about a pivotal axis, releasable locking means for automatically securely locking the housing in a selected angular position, quick release means for releasing the releasable locking means to allow pivotal movement of said housing to a new angular portion thereof, said quick release means being mounted on said housing and being accessible through said open end thereof, a removable grid mounted in said housing adjacent said open end thereof and engageable with the lamp, and biasing means urging the lamp into engagement with the grid.

7. In a passenger reading light for use in an aircraft having a passenger reading light supporting structure therein, the combination of:

a housing having a peripheral wall and at least one open end;

socket means mounted within said housing for receiving a lamp, said peripheral wall surrounding the lamp and directing the light from the lamp outwardly through said open end in a confined beam;

means for mounting said housing on said supporting structure for pivotal movement about a pivotal axis to allow angular movement of the housing and the confined beam about the pivotal axis to a plurality of angular positions;

releasable locking means for automatically securely locking the housing in a selected angular position;

quick release means for releasing said releasable locking means to allow pivotal movement of said housing to a new angular position about said pivotal axis; and said locking means including a first locking member mounted on said housing for pivotal movement therewith and a second locking member rigidly mounted on said supporting structure and biasing means for normally holding said locking members in locking engagement to thereby lock said housing in said selected angular position.

8. An interior light for an aircraft having a light supporting structure therein, the combination of:

a housing including a first housing section and a collimator terminating outwardly in an open end;

means for mounting the housing on the light supporting structure;

socket means mounted within said housing remote from said open end for receiving an electric lamp, said collimator surrounding the lamp and extending axially outwardly beyond the end of the lamp to direct the light therefrom outwardly through said open end in a confined beam;

a light transmitting grid on said collimator adjacent said open end and spaced from said socket means to provide a space for the electric lamp, said lamp being supported by said socket and said grid, said collimator being removable from said first housing section to provide access to the lamp; and means for resiliently biasing the lamp into engagement with said grid.

9. A light as defined in claim 8 including a step down transformer mounted within said housing and electrically connected to a source of electrical energy and to the electric lamp.

10. An aircraft passenger reading light system comprising:

an aircraft having a plurality of passenger seats and a supporting structure above the passenger seats;

a plurality of passenger reading lights, each of said passenger reading lights being adapted to use electrical power of a first voltage;

means for mounting said passenger reading lights on the supporting structure with each of said lights being disposed generally above one of the passenger seats;

each of said passenger reading lights including means for mounting an electric lamp and means for directing the illumination from the lamp generally downwardly in a confined beam toward the passenger seat therebelow;

an electrical power source for providing electric power at a second voltage which is greater than said first voltage;

a plurality of step down transformers, one of said transformers being provided for each of said passenger reading lights, each of said transformers being capable of reducing said second voltage to said first voltage;

means for mounting each of said transformers closely adjacent a passenger reading light whereby one of said transformers is mounted closely adjacent each of the passenger reading lights;

first conductor means for electrically connecting each of said transformers to said source of electrical power;

second conductor means for electrically connecting each of said transformers to its associated passenger reading light whereby each of said passenger reading lights has its own transformer from which electric power at said first voltage can be drawn;

each of said passenger reading lights including a housing having an open end, the associated transformer being mounted within said housing, said means for mounting an electric lamp being mounted within said housing; and each of said transformers being annular and surrounding at least a portion of said means for mounting an electric lamp of the associated passenger reading light.

11. A low voltage light electrically connectible to a relatively high voltage source of electrical energy comprising:

a housing having a peripheral wall and an open end;

socket means mounted within said housing remote from said open end for receiving an incandescent lamp which is adapted to be operated by relatively low voltage electrical power, said peripheral wall surrounding the lamp and directing the light therefrom outwardly through said open end;

a light transmitting member mounted on said housing and extending generally across the open end thereof;

a transformer mounted within said housing and having a primary and secondary with the primary being electrically connectible to the high voltage source for reducing the voltage thereof to a relatively low value which is readily usable by the lamp;

conductor means for electrically interconnecting the lamp and the secondary of the transformer; and the lamp extending between the socket means and the light transmitting member, said light including means for resiliently biasing the lamp into engagement with the light transmitting member.

References Cited

UNITED STATES PATENTS

| | | | |
|---|---|---|---|
| 1,885,973 | 11/1932 | Wilson | 40—130 |
| 2,214,600 | 9/1940 | Winkler | 240—78 |
| 2,437,522 | 3/1948 | Handler | 240—78 XR |
| 2,625,646 | 1/1953 | Goebel | 240—41.6 XR |
| 2,654,830 | 10/1953 | Runge et al. | 240—78 |
| 2,782,295 | 2/1957 | Schwenkler | 240—7.35 |
| 2,979,687 | 4/1961 | Clayton | 240—7.35 XR |
| 3,194,957 | 7/1965 | Caldwell | 240—11.4 |
| 3,310,673 | 3/1967 | Fletcher | 240—81 |
| 3,435,206 | 3/1969 | Swanson | 240—11.4 |

NORTON ANSHER, Primary Examiner

D. S. STALLARD, Assistant Examiner

U.S. Cl. X.R.

240—7.35, 78